(12) United States Patent
Schwarz

(10) Patent No.: US 11,262,849 B2
(45) Date of Patent: Mar. 1, 2022

(54) USER INTERFACE, A MEANS OF TRANSPORTATION AND A METHOD FOR CLASSIFYING A USER GESTURE PERFORMED FREELY IN SPACE

(71) Applicant: VOLKSWAGEN AKTIENGESELLSCHAFT, Wolfsburg (DE)

(72) Inventor: Thomas Schwarz, Berlin (DE)

(73) Assignee: VOLKSWAGEN AKTIENGESELLSCHAFT, Wolfsbirg (DE)

( * ) Notice: Subject to any disclaimer, the term of this patent is extended or adjusted under 35 U.S.C. 154(b) by 894 days.

(21) Appl. No.: 15/435,126

(22) Filed: Feb. 16, 2017

(65) Prior Publication Data

US 2017/0235375 A1 Aug. 17, 2017

(30) Foreign Application Priority Data

Feb. 17, 2016 (DE) ...................... 10 2016 202 455.8

(51) Int. Cl.
*G06F 3/01* (2006.01)
*G06F 3/03* (2006.01)
*B60K 37/06* (2006.01)

(52) U.S. Cl.
CPC .............. *G06F 3/017* (2013.01); *B60K 37/06* (2013.01); *G06F 3/0304* (2013.01); *B60K 2370/146* (2019.05); *B60K 2370/1464* (2019.05); *B60K 2370/52* (2019.05)

(58) Field of Classification Search
None
See application file for complete search history.

(56) References Cited

U.S. PATENT DOCUMENTS

| 2011/0289455 A1* | 11/2011 | Reville ................. G06F 3/011 |
| | | 715/830 |
| 2013/0215017 A1* | 8/2013 | Qin ....................... G06F 3/017 |
| | | 345/156 |
| 2014/0078318 A1* | 3/2014 | Alameh ............... G06F 3/0304 |
| | | 348/207.99 |

(Continued)

FOREIGN PATENT DOCUMENTS

| DE | 102012216181 | 6/2014 |
| DE | 102014201578 | 7/2015 |

(Continued)

OTHER PUBLICATIONS

German Patent Appln. No. 10 2016 202 455.8. Search Report (dated Nov. 1, 2016).

(Continued)

*Primary Examiner* — Christopher R Lamb
(74) *Attorney, Agent, or Firm* — Loza & Loza, LLP; Peter Zura

(57) ABSTRACT

A user interface, a computer program product, a signal sequence, a means of transportation and a method for classifying a user gesture performed freely in space. A first gesture and/or a second gesture may be detected by a sensor. A processor may compare a first characteristic of the first gesture with a first characteristic of a second gesture, and, as a function of the comparison, the first gesture may be classified in contrast to the second gesture as an intended user input.

19 Claims, 2 Drawing Sheets

(56) References Cited

U.S. PATENT DOCUMENTS

2014/0118244 A1     5/2014   Kaplan et al.
2016/0098094 A1*   4/2016   Minkkinen ............. G06F 3/017
                                                                                                    345/156

FOREIGN PATENT DOCUMENTS

| DE | 102014202490 | 8/2015 |
| DE | 102014202834 | 9/2015 |
| WO | WO2014072786 | 5/2014 |
| WO | WO2015131954 | 9/2015 |

OTHER PUBLICATIONS

First Office Action in co-pending CN Application 201710086359.9, dated Feb. 17, 2017, 15 pages.

* cited by examiner

USER INTERFACE, A MEANS OF TRANSPORTATION AND A METHOD FOR CLASSIFYING A USER GESTURE PERFORMED FREELY IN SPACE

RELATED APPLICATIONS

The present application claims priority under 35 U.S.C. § 119 to German Patent Application No. 10 2016 202 455.8, filed Feb. 17, 2016 to Thomas Schwrarz, the contents of which is incorporated by reference in its entirety herein.

TECHNICAL FIELD

The present invention relates to a user interface, a means of transportation and a method for classifying a user gesture performed freely in space (also: "3D gesture"). In particular, the present invention relates to the differentiation between input gestures and return gestures that are performed in the detection area of the user interface.

BACKGROUND

Technical apparatuses, in particular means of transportation, that can be operated by swipe gestures, which the user performs while in contact with a surface of a display apparatus ("touch screen"), are known in the art. Approaches that utilize 3D gestures for providing input have also been pursued increasingly. To this end, using a sensor, a detection area is created in a predefined space inside which the gestures by the user are detected, interpreted and analyzed in terms of their interaction with the user interface. Swipe gestures, in particular, pose a challenge for the processing of information in that intended user input provided by the hand of the user must be differentiated from a "return gesture" by which the hand of the user, for example, is returned to the starting position thereof. Swipe gestures are often defined particularly for horizontal inputs. Exemplary sensors for the detection of swipe gestures are "Leap Motion" or "HALIOS" by Mechaless.

Forward and return gestures in known implementations, defined as motion between two intended gestures, are often erroneously interpreted as proper gestures thus resulting in a false operation or unintended responses by the user interface.

DE 10 2014 202 834 A1 and WO 2015/131954 A1 disclose user interfaces that can be operated by user gestures that are performed freely in space.

BRIEF SUMMARY

The present disclosure enables techniques for differentiation between a swipe gesture and a return motion inside the detection area of a sensor.

According to various illustrative embodiments, techniques are disclosed for classifying a user gesture that is performed freely in space. For example, a first gesture and a second gesture may be detected by a sensor. This can be achieved, for example, using a sensor that is integrated inside the housing of a user end device. Alternatively or additionally, the sensor can also be disposed inside a means of transportation that is equipped according to the invention. A first characteristic of the first gesture is then compared to a characteristic of the second gesture.

BRIEF DESCRIPTION OF THE DRAWINGS

Referring to the enclosed drawings, embodiments of the present invention are described below. In said drawings.

DETAILED DESCRIPTION

Figure 1:
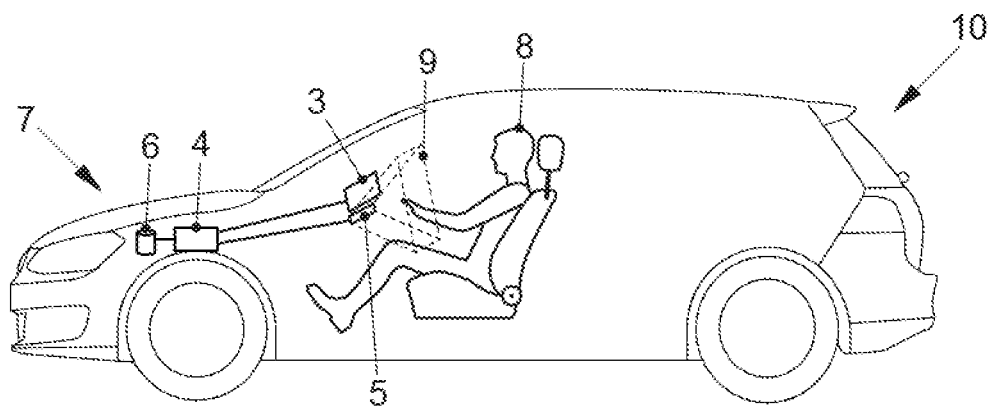
FIG. 1 is a schematically depicted overview of an embodiment of a means of transportation comprising a user interface designed according to an illustrative embodiment.

Under various illustrative embodiments, techniques are disclosed for classifying a user gesture that is performed freely in space. For example, a first gesture and a second gesture may be detected by a sensor. This can be achieved, for example, using a sensor that is integrated inside the housing of a user end device. Alternatively or additionally, the sensor can also be disposed inside a suitably-equipped means of transportation, such as a vehicle. A first characteristic of the first gesture may then then compared to a characteristic of the second gesture.

For example, a direction and/or a curvature and/or a speed and/or a length, etc. of a first gesture may be compared to a corresponding characteristic of a second gesture. Alternately, a distance of a trajectory of the first gesture, relative to a trajectory of the second gesture, can be analyzed in certain illustrative embodiments. As a function of a comparison, the first gesture is classified as an intentional user input. The second gesture, in contrast, can be classified as a return gesture. In some illustrative embodiments, this may mean that the classification of a gesture is recognized based on a second gesture effected by the user. For example, a first gesture may have been detected immediately prior to the second gesture, where the first gesture and the second gesture both relate to an identical operating event or an identical operating step, respectively, as performed by the user.

The first gesture and the second gesture can relate, for example, to essentially identical screen content. Alternatively or additionally, the first gesture and the second gesture can refer to the operation of an identical application and/or an identical program of the user interface. In some illustrative embodiments, no user inputs may be detected between the first gesture and the second gesture. In such a case, the first gesture transitions seamlessly into the second gesture. In some illustrative embodiments, instead of using a predefined reference for classifying the first gesture and the second gesture, which prescribes essentially similar motions for all users of the user interface according to the invention, a plurality of sequentially performed gestures are compared to each other to thereby optimally take into account any personal idiosyncrasies in the gesturing of each user. The result in such a case my be an especially high detection rate and especially few recognized errors. In some illustrative embodiments, if the user interface is disposed inside a means of transportation, it can further improve traffic safety.

Preferably, the first gesture can be differentiated from the second gesture by a respective speed portion having different algebraic measurements that may be substantially parallel relative to a display unit. The display unit can be, for example, a touch screen that can be operated via 3D user gestures. If the motion components of the first gesture and of the second gesture are vectorially broken down, e.g. using a predefined Cartesian system of coordinates, a not-same sign of a motion component can serve as the cause for distinguishing the first gesture from the second gesture and/or for treating the first gesture as a separate gesture relative to the second gesture. Due to the fact that a return gesture is often performed substantially in the opposite direction relative to the input gesture, this can be a useful indicator for the presence of two gestures.

The first gesture and the second gesture can thus be detected without leaving a sensory detection area in the interim. While the prior art often requires a quitting of the detection area in order to perform a third gesture that is similar to the first gesture, the hand of the user can, under certain embodiments, traverse the detection area in the opposite direction without the second gesture being falsely interpreted as an intentional user input. This means, under certain embodiments, continuously assuming the position of the input means is therefore not an obstacle to successful swipe gesture recognition.

Under certain embodiments, the first gesture can be differentiated from the second gesture, for example, by its curvature, whereby a convex characteristic in the direction of a display apparatus operated by the user is more pronounced for the first gesture than a correspondingly determined convex (or even concave) characteristic for the second gesture. Alternatively or additionally, a mean distance between the curve shape of the first gesture and the curve shape of the second gesture can be compared to a predefined reference, and if the distance, as defined by the reference, is exceeded, the first gesture can be classified as intended user input and the second gesture can be classified as return gesture (or vice versa). If the value falls below the respective reference, the first gesture and the second gesture can be classified either as intended user input or as return motion. The distance of the center of gravity of a line of the curve shape of the first gesture to the center of gravity of the curve shape of the second gesture can be determined as the "mean distance."

To be able to perform a plurality of swipe gestures in succession, it may be necessary to connect the swipe gestures with other motions. These connecting motions can also be understood as "back/forth motions." The proposed algorithm according to the invention receives the current hand position as input. Based on motion segmentation steps and the extraction of attributes, it is possible to then decide as to whether the motion is a swipe motion or merely a back/forth return motion. In certain illustrative embodiment, a neural network can be used to perform evaluation function with respect to user gestures. Also, adaptive planes may be utilized for improving detection rate(s).

The present disclosure also enables filtering of the back/forth motion, and dynamically adapting the determination of the planes where the motions are performed. An expected input for the algorithm may be, for example, a series of center positions of the hand. To be able to differentiate between horizontal swipe gestures (i.e., from left to right and vice versa) from vertical swipe gestures (i.e., from top to bottom and vice versa), it is possible to define a horizontal and a vertical plane in advance. Using the planes, motions can be broken down into individual motion segments. As long as the sequences of the directions of motion are performed in the same direction within the plane, these measured values can be combined as one motion segment. Based on the determined motion segments, as previously mentioned, it is possible to extract attributes that classify the motion. For example, this can be achieved based on speed, acceleration, curve shape, the relative position in comparison to the previous motion and based on the position relative to the sensor. The attributes of the motion segments may then be used for a comparison of two sequential motion segments.

To this end, it is possible to train a neural network in advance which is able to determine on the basis of known attribute combinations as to whether a motion is a swipe gesture or a back/forth gesture. In some illustrative embodiments, the neural network can either be specifically trained for a single target person or constitute a general network (preferred if no calibration is to take place) where different persons have familiarized the network with their swipe gestures. Since motions by different users can be, on the one hand, executed individually and can, on the other hand, therefore be variably positioned relative to the sensor, it is possible that motions are not exactly inside the horizontal plane or inside the vertical plane, respectively. To prevent detection issues that may ensue, the present disclosure provides for the possibility of placing a compensation plane through the positions of the first gesture and second gesture, respectively. The compensation plane can then be compared to the predefined planes (e.g., the horizontal and vertical planes) and assigned to the most likely one of the two planes. In other words, the compensation plane that has been determined based on measured values is converted into a reference plane. This facilitates better and resource-saving detection of swipe gestures.

According to other illustrative embodiments, a user interface for classifying a user gesture performed freely in space is proposed. The user interface comprises a sensor that is set up to detect a first gesture and a second gesture by sensing means and forward the corresponding measured signals to an evaluation unit. The evaluation unit may be configured to compare a first characteristic of the first gesture to a first characteristic of the second gesture and to classify, as a function of said comparison, the first gesture in contrast to the second gesture as intended user input. In other words, the user interface may use a first gesture performed by the user at a first point in time and detected by the sensing means as a reference for classifying a second gesture performed at a later point in time (and vice versa). Therefore, the user interface is set up such that it implements the features, combined features and advantages following therefrom corresponding to the first-mentioned aspect of the invention, as disclosed herein.

In some illustrative embodiments, the user interface can include a display unit that is set up to display content that can be operated by user gestures performed freely in space. The display unit can be designed as a touch-sensitive display apparatus for accepting 3D gestures performed while maintaining contact with the display.

In some illustrative embodiments, the display unit can be configured as a central information display, as a combination instrument, or the like, that is disposed inside a means of transportation.

Alternatively or additionally, the display unit can be configured as a touch-sensitive screen and disposed inside a portable mobile user end device (e.g., a wireless communication end user device, such as a smartphone, tablet, and the like). This way, the present disclosure can optimally support possible detection of swipe gestures that are performed freely in space, inside means of transportation, as well as in connection with portable user end devices and other technical apparatuses.

In some illustrative embodiments, a computer program product (e.g., a data storage means) is proposed where instructions are stored that enable the programmable processor to execute the steps of one or more methods disclosed herein. The computer program product can be designed, for example, as a CD, DVD, Blue Ray disc, flash memory, hard drive, RAM/ROM, cache, etc. In connection with a sensor suited for detecting 3D gestures, the computer program product can be used for setting up a user interface according to the invention. In some illustrative embodiments, a signal sequence performed in a tangible environment is disclosed representing instructions that can enable a programmable processor to execute the steps of one or more methods disclosed herein.

Turning to FIG. 1, the exemplary illustration shows a passenger car 10 as an embodiment of a means of transportation according to the present disclosure in which a user 8 moves his hand inside a detection area 9 of a sensor 5. The detection area 9 may be configured as an area in front of a screen 3 as a display unit of the user interface 7 and content depicted thereon can be manipulated by user 8 by means of 3D swipe gestures. The signals that the sensor 5 detects then undergo an processor-based workup and are forwarded to an electronic control device 4 serving as an evaluation unit that analyzes the user gestures and forwards correspondingly manipulated image signals to screen 3. References for predefined gestures and instructions for executing the method according to an illustrative embodiment are stored inside a data storage 6, which is linked by processor-based means to an electronic control device 4, and held available for use by the electronic control device 4. Instead of inside a passenger car 10, the components 3, 4, 5 and 6 of the depicted user interface 7 can also be disposed in a corresponding fashion inside a mobile user end device, particularly a smartphone, a tablet, and the like, and used in an identical way.

Figure 2:
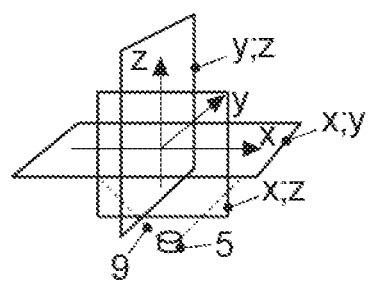
FIG. 2 is a schematic depiction of two orthogonal planes that are generated within a detection area of a user interface designed according to an illustrative embodiment.

FIG. 2 shows a Cartesian system of coordinates, including the axes x, y, z and the planes x,y; x,z; y,z as created by the axes x, y, z that are in total at least partially located inside a detection area 9 of a sensor 5 for detecting three-dimensional user inputs.

Figure 3:
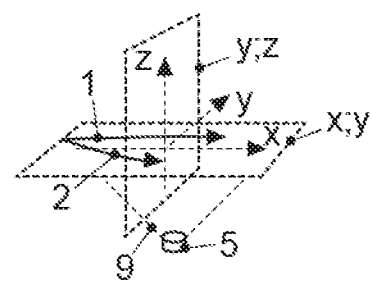
FIG. 3 is a schematic depiction of a segmentation of a motion according to an illustrative embodiment of a first gesture and a second gesture.

FIG. 3 shows two line segments 1, 2 as first gesture and second gesture that differ in terms of a sign as to their speed in the x-direction under one illustrative emample. Here, the first gesture 1 is arranged completely inside the positive range of y-values, while the second gesture 2 is arranged primarily inside the negative range of y-values. This way, it is possible to achieve a segmentation of the motion of the first gesture 1 and the second gesture 2 in that those position sections that include negative dx/dt values are viewed and analyzed as components of the first gesture 1 and in that those motion components that include positive dx/dt values are understood as the second gesture. In this context, dx/dt is the temporal derivation of the x-values, which is, in other words, the speed in the x-direction.

Figure 4:
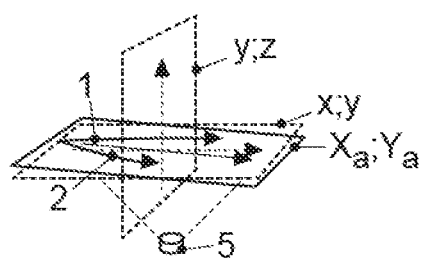
FIG. 4 is a schematic depiction of an adaption of the horizontal plane for the segmentation of a motion under an illustrative embodiment.

FIG. 4 shows an example for the adaption of an evaluation plane $x_a$, $y_a$ that has been swung about the y-axis relative to the horizontal plane x, y. Due to the fact that the positions within gestures 1, 2 are essentially inside the adapted plane $x_a$, $y_a$ and whereby z-values can be neglected, it is possible to arrive, in terms of computing complexity, at a simplified analysis and thereby a faster and safer classification of the first gesture and the second gesture 1, 2. In addition, this plane can be reused in the segmenting of future swipe gestures. This results in better precision of the segmentation, as noted in connection with a sign change of the motion vectors.

Figure 5:
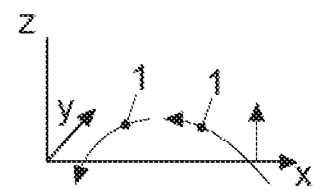
FIG. 5 is a schematic depiction of a motion immersing in the direction of a display plane under an illustrative embodiment.

FIG. 5 shows a curved first gesture 1 that is essentially performed in the plane x, y and has a convex configuration relative to a surface of a display unit (not shown) disposed behind the system of coordinates. In other words, the first gesture 1 initially immerses itself in a balance surface located parallel relative to the surface of the display unit and exits the same again in the further course. In other words, the center point of the curve of the gesture is oriented away from the display unit. At a higher level, the depicted first gesture 1 can be understood as a swipe gesture directed to the left. An immersing gesture, such as depicted here, often represents an intended user input. In other words, with the swipe gesture, the user wishes to manipulate the depicted content of the display.

Figure 6:
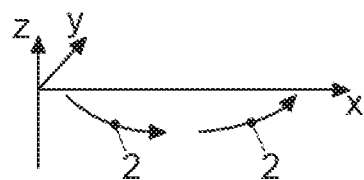
FIG. 6 is a schematic depiction of a motion emerging from the direction of a display plane under an illustrative embodiment.

FIG. 6 shows an illustrative embodiment of a principle depiction of a gesture emerging from the plane x, y that has, relative to a surface of the display unit disposed behind the Cartesian system of coordinates, a concave appearance. In other words, the center point of the curve of the gesture is oriented in the direction of the display unit while the center point of the curve in FIG. 5 is oriented away from the display unit.

In this example, a second gesture 2 having a curved orientation relative to the display surface, as depicted, is often employed by the user when the user wants the system to understand the motion as a return motion, meaning specifically not as any intentional gesture that the system must respond to with an assigned manipulation relative to the content of the display.

Figure 7:
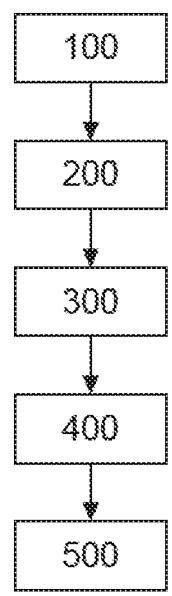
FIG. 7 is a flow chart illustrating the steps of an embodiment of a method according to an illustrative embodiment.

FIG. 7 shows steps of an illustrative embodiment for classifying a user gesture that is performed freely in space. In step 100, a first gesture is detected by sensing means. In step 200, a second gesture is detected by sensing means. Both previously mentioned steps can occur simultaneously and independently of system processing, for a time period (e.g., continuously). In step 300, the first gesture is differentiated from the second gesture by a respective speed portion with different signs that is substantially parallel relative to a display unit. Stated in simpler terms, a first swipe gesture that is performed in a first direction and a second swipe motion that is performed in a second, opposite direction are identified based on the user input. In step 400, a first characteristic of the first gesture is compared to a first characteristic of the second gesture. As a function of this comparison, in step 500, the first gesture is classified, in contrast to the second gesture, as an intended user input, while the second gesture is interpreted as a return motion. This means only the first gesture will result in a manipulation of the user interface.

Even though the aspects according to the present disclosure and advantageous embodied examples thereof have been described in detail based on the embodiments as explained in connection with the enclosed figures in the drawings, a person skilled in the art will perceive modifications and combinations of features of the depicted embodiments without exceeding the scope of the present invention, the scope of protection of which is specified by the appended claims.

LIST OF REFERENCE SIGNS

1 First gesture
2 Second gesture

3 Screen
4 Electronic control device
5 Sensor
6 Data storage
7 User interface
8 User
9 Detection area
10 Passenger car
100 to 500 Method steps
x, y, z Coordinates
$x_a$, $y_a$ Adapted coordinates

The invention claimed is:

1. A processor-based method for detecting an input for a device, comprising:
   receiving gesture data associated with predefined reference planes relative to a detection area of the device;
   detecting, via a sensing apparatus, a first gesture in the detection area for the device along at least one of a plurality of compensation planes;
   detecting, via a sensing apparatus, a second gesture in the detection area for the device, along at least one of the plurality of compensation planes, wherein the first gesture and second gesture are detected chronologically in a time period;
   comparing, via an evaluation unit, at least one characteristic comprising a curvature of a trajectory of the first gesture to at least one characteristic of the second gesture;
   comparing, via a trained network in the evaluation unit, the respective compensation plane of the first gesture and second gesture to the gesture data of the predefined reference planes;
   converting at least one of the respective compensation planes of the first gesture and second gesture to the gesture data of the predefined reference planes based on the comparison; and
   detecting, via a processor, a predetermined user input for the device based on the comparing of the at least one characteristic of the first gesture to the at least one characteristic of the second gesture.

2. The processor-based method of claim 1, wherein detecting the first gesture and the second gesture comprises detecting movements in a horizontal and vertical plane in the detection area for the device.

3. The processor-based method of claim 1, wherein the trained network comprises a neural network.

4. The processor-based method of claim 1, wherein the at least one characteristic of the first gesture comprises at least one of direction, curvature, speed, length, and/or distance of trajectory of the gesture, and wherein the at least one characteristic of the second gesture comprises at least one of direction, curvature, speed, length, and/or distance of trajectory of the second gesture.

5. The processor-based method of claim 1, wherein the first gesture and second gesture are detected chronologically in a continuous time period.

6. The processor-based method of claim 1, further comprising manipulating a user interface of the device based on the detected predetermined user input.

7. The processor-based method of claim 1, wherein
   the curvature of the trajectory of the first gesture comprises a convex orientation relative to a surface of a display unit of the device, and/or
   the curvature of the trajectory of the second gesture comprises a concave orientation relative to a surface of a display unit of the device.

8. A system for detecting an input for a device, comprising:
   a memory for receiving gesture data associated with predefined reference planes relative to a detection area of the device;
   a sensing apparatus for detecting a first gesture in the detection area for the device along at least one of a plurality of compensation planes, and for detecting a second gesture in the detection area for the device along at least one of the plurality of compensation planes, wherein the sensing apparatus is configured to detect the first gesture and second gesture chronologically in a time period;
   an evaluation unit, operatively coupled to the sensing apparatus, wherein the evaluation unit is operable to
      compare at least one characteristic comprising a curvature of a trajectory of the first gesture to at least one characteristic of the second gesture,
      compare, via a trained network in the evaluation unit, the respective compensation plane of the first gesture and second gesture to the gesture data of the predefined reference planes,
      convert at least one of the respective compensation planes of the first gesture and second gesture to the gesture data of the predefined reference planes based on the comparison, and
   a processing apparatus, operatively coupled to the evaluation unit, wherein the processing apparatus is operable to detect a predetermined user input for the device based on the comparing of the at least one characteristic of the first gesture to the at least one characteristic of the second gesture.

9. The system of claim 8, wherein the evaluation unit is operable to detect movements in a horizontal and vertical plane in the detection area for the device.

10. The system of claim 8, wherein the trained network comprises a neural network.

11. The system of claim 8, wherein the at least one characteristic of the first gesture comprises at least one of direction, curvature, speed, length, and/or distance of trajectory of the gesture, and wherein the at least one characteristic of the second gesture comprises at least one of direction, curvature, speed, length, and/or distance of trajectory of the second gesture.

12. The system of claim 8, wherein the evaluation unit is configured to detect the first gesture and second gesture chronologically in a continuous time period.

13. The system of claim 8, wherein the processing apparatus is operable to manipulate a user interface of the device based on the detected predetermined user input.

14. A system for detecting an input for a device, comprising:
   a memory for receiving gesture data associated with predefined reference planes relative to a detection area of the device;
   a sensing apparatus for detecting a first gesture in the detection area for the device along at least one of a plurality of compensation planes, and for detecting a second gesture in the detection area for the device along at least one of the plurality of compensation planes, wherein the sensing apparatus is configured to detect the first gesture and second gesture chronologically in a time period in three-dimensional space, and wherein the second gesture is different from the first gesture;
   an evaluation unit, operatively coupled to the sensing apparatus, wherein the evaluation unit is operable to compare at least one characteristic comprising a curvature of a trajectory of the first gesture to at least one characteristic of the second gesture;

comparing, via a trained network in the evaluation unit, the respective compensation plane of the first gesture and second gesture to the gesture data of the predefined reference planes, converting at least one of the respective compensation planes of the first gesture and second gesture to the gesture data of the predefined reference planes based on the comparison, and a processing apparatus, operatively coupled to the evaluation unit, wherein the processing apparatus is operable to detect the first gesture as an intentional gesture and detect a predetermined user input for the device based on the comparing of the at least one characteristic of the first gesture to the at least one characteristic of the second gesture.

15. The system of claim 14, wherein the evaluation unit is operable to detect movements in a horizontal and vertical plane in the detection area for the device.

16. The system of claim 14, wherein the trained network comprises a neural network.

17. The system of claim 14, wherein the at least one characteristic of the first gesture comprises at least one of direction, curvature, speed, length, and/or distance of trajectory of the gesture, and wherein the at least one characteristic of the second gesture comprises at least one of direction, curvature, speed, length, and/or distance of trajectory of the second gesture.

18. The system of claim 14, wherein the evaluation unit is configured to detect the first gesture and second gesture chronologically in a continuous time period.

19. The system of claim 14, wherein the processing apparatus is operable to manipulate a user interface of the device based on the detected predetermined user input.

* * * * *